(12) United States Patent
Wu et al.

(10) Patent No.: US 8,348,654 B2
(45) Date of Patent: Jan. 8, 2013

(54) MOLDING APPARATUS HAVING COUNTER

(75) Inventors: Xiao-ping Wu, Tu Cheng (TW);
Shih-hsiung Ho, Tu Cheng (TW);
Kun-hsueh Chiang, Tu Cheng (TW)

(73) Assignee: Cheng Uei Precision Industry Co., Ltd., Tu-Cheng, Taipei (TW)

(*) Notice: Subject to any disclaimer, the term of this patent is extended or adjusted under 35 U.S.C. 154(b) by 337 days.

(21) Appl. No.: 12/901,371

(22) Filed: Oct. 8, 2010

(65) Prior Publication Data

US 2012/0088001 A1    Apr. 12, 2012

(51) Int. Cl.
*B28B 17/00* (2006.01)
(52) U.S. Cl. .................................. 425/169; 425/577
(58) Field of Classification Search .................. 425/169, 425/577; 377/15
See application file for complete search history.

(56) References Cited

U.S. PATENT DOCUMENTS

2004/0247724 A1* 12/2004 Manner .................... 425/149

* cited by examiner

*Primary Examiner* — Yogendra Gupta
*Assistant Examiner* — Ninh Le
(74) *Attorney, Agent, or Firm* — Cheng-Ju Chiang

(57) ABSTRACT

Disclosed is a molding having a counter, comprising a fixed half, a moving half, a counter, a locator and a counting operator. The fixed half is opened with a through hole. The moving half is functioned in accordance with the fixed half. The locator is positioned at the moving half. The counting operator is slidably set at the moving half and comprises a sliding main body, a locator and a contacting bump. The sliding main body comprises two locating slots positioned at one end thereof. The locator extends into the locating slots to locate the counting operator. The contacting bump is positioned on the sliding main body and can press the contacting part of the counter. With the locator and the counting operator of the present invention, wrong records of non productive molding can be avoided and the counter does not have to be removed during the mold-repair.

4 Claims, 3 Drawing Sheets

MOLDING APPARATUS HAVING COUNTER

BACKGROUND OF THE INVENTION

1. Field of the Invention

The present invention generally relates to a molding, and more particularly, to a molding having a counter.

2. Description of Prior Art

Generally, a molding of prior art is equipped with a counter for counting the number of times of forming products.

However, records of such counter cannot be clear during usage and the counter has to be removed for maintenances to avoid wrong records of non productive molding. Therefore, due to disassembly and assembly occur so often, the mold-repair efficiency and the life time of the counter will be unavoidably impacted.

SUMMARY OF THE INVENTION

An objective of the present invention is to provide a molding having a counter capable of avoiding wrong records of non productive molding and removing the counter during the mold-repair.

For realizing the aforesaid objective, the molding having a counter comprises a fixed half, a moving half, a counter, a locator and a counting operator. The fixed half is opened with a through hole. The moving half is functioned in accordance with the fixed half. The locator is positioned at the moving half. The counting operator is slidably set at the moving half and comprises a sliding main body, a locator and a contacting bump. The sliding main body comprises two locating slots positioned at one end thereof. The locator extends into the locating slots to locate the counting operator. The contacting bump is positioned on the sliding main body and can press the contacting part of the counter.

As aforementioned, as the record for the productive molding has to go for the molding having counter, the contacting bump of the counting operator can be moved above the contacting part of the counter, then, the locator dips into one of the locating slots to locate the counting operator after the mold opening. When the mold closing is done, the contacting bump of the counting operator pressed the contacting part of the counter and one productive molding is counted. As the record for the productive molding does not have to go, the contacting bump of the counting operator can be moved aside the contacting part of the counter, then, the locator dips into the other locating slots to locate the counting operator after the mold opening. Therefore, the contacting bump of the counting operator will not press the contacting part of the counter when the mold closing is done. Accordingly, the counter of the molding does not have to be removed during the mold-repair.

DETAILED DESCRIPTION OF THE INVENTION

Figure 1:
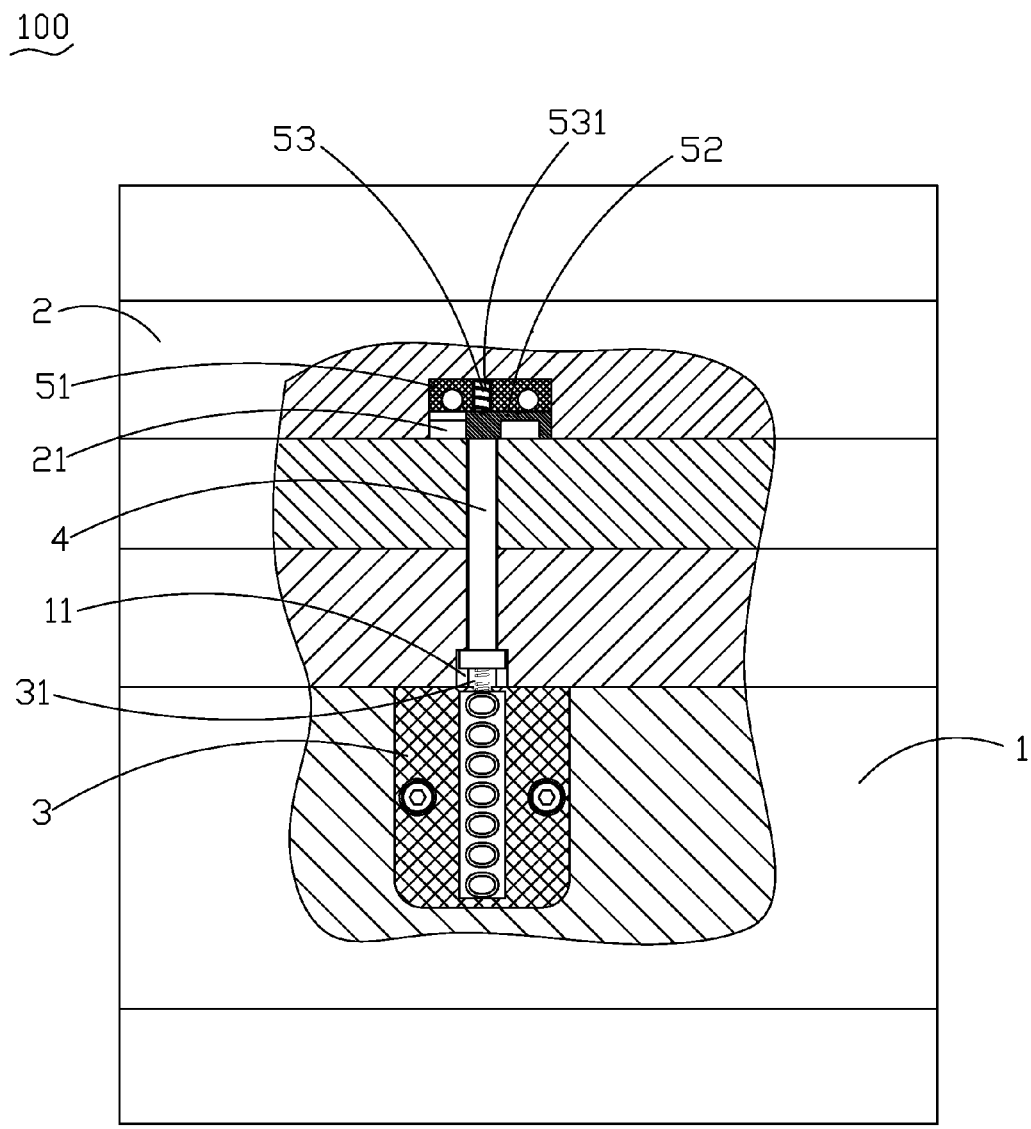
FIG. 1 shows a partial sectional view diagram of a molding having a counter proceeding the counting according to the present invention.

Please refer to FIG. 1. The molding having a counter 100 of the present invention comprises a fixed half 1 opened with a through hole 11, a moving half 2, a counter 3, an operation thimble 4, a fixing block 51, a counting operator 52 and a locator 53.

The moving half 2 is functioned in accordance with the fixed half 1. An accommodating area 21 is positioned at the moving half 2. The counter 3 is positioned at the fixed half 1 and comprises a contacting part 31 extending into the through hole 11 of the fixed half 1.

Figure 2:
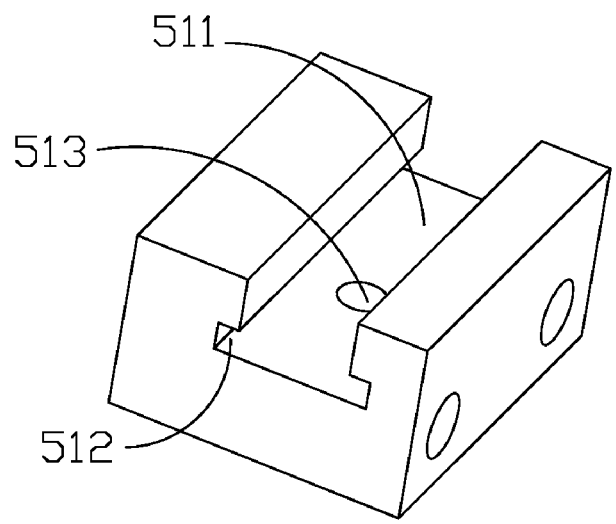
FIG. 2 shows a three dimensional view diagram of a fixing block shown in FIG. 1.

Please refer to FIG. 1 and FIG. 2. The fixing block 51 is accommodated in the accommodating area 21. A locating through hole 513 is opened in the fixing block 51. Meanwhile, a fitting slot 511 is formed in the fixing block 51 and the bottom of the fitting slot 511 extends toward two sides and forms a spacing slideway 512.

In this embodiment, the locator 53 comprises a spring 531 and a clipped steel ball (not shown) which one end thereof reaches and presses spring 531. The locator 53 is positioned and installed in the locating through hole 513 of the fixing block 51. As the locator is installed, the spring 531 is first put into the locating through hole 513. Then, the clipped steel ball is put into the locating through hole 513. One end of the clipped steel ball inside the locating through hole 513 reaches and presses spring 531. A portion of the other end of the clipped steel ball is exposed out of the locating through hole 513.

The operation thimble 4 is movably set in the through hole 11 of the fixed half 1. One end of the operation thimble 4 reaches the contacting part 31 of the counter 3 and other end of the operation thimble 4 dips into the fitting slot 511 of the fixing block 51.

Figure 3:
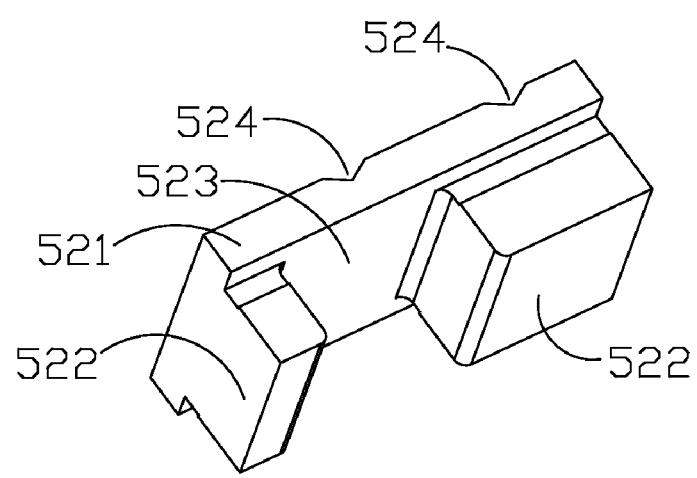
FIG. 3 shows a three dimensional view diagram of a counting operator shown in FIG. 1.

Please refer to FIG. 1, FIG. 2 and FIG. 3. The counting operator 52 is accommodated in the accommodating area 21 and overlaps with the fixing block 51. The counting operator 52 comprises a sliding main body 521, a locator 53 and a contacting bump 522. The sliding main body 521 comprises two locating slots 524 positioned at one end thereof. The exposed portion of the clipped steel ball of the locator 53 extends into the locating slots 524 to locate the counting operator 52. The sliding main body 521 is slidably set in the spacing slideway 512. The contacting bump 522 is positioned on the opposite surface of the sliding main body 521 where the locating slot 524 is positioned thereon. The contacting bump 522 is set in the fitting slot 511. The contacting bump 522 can press the operation thimble 4 when the counting operator 52 is moved to one side of the accommodating area 21.

Please refer to FIG. 1. For the present invention, as the record of the counter 3 for the productive molding has to go, the counting operator 52 can be moved to the right side of the fixing block 51 to force the clipped steel ball of the locator 53 to be clipped inside one locating slot 524 of the counting operator 52. At this moment, the contacting bump 522 of the counting operator 52 is moved above the operation thimble 4. Therefore, as the mold closing is done, the contacting bump 522 pressed the operation thimble 4 and then pressed the contacting part 31 of the counter 3. One productive molding is counted.

Figure 4:
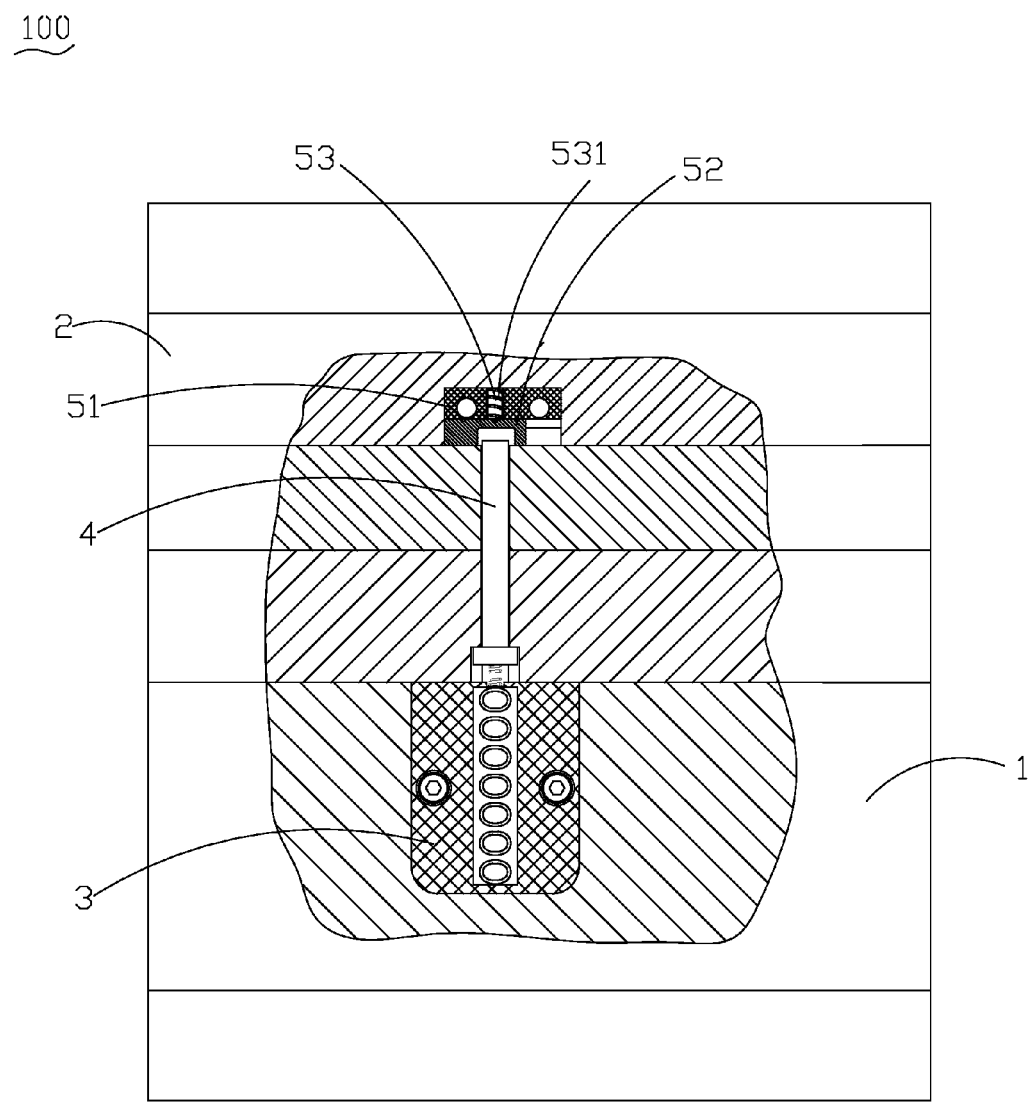
FIG. 4 shows a partial sectional view diagram of a molding having a counter not proceeding the counting according to the present invention.

Please refer to FIG. 4. As the record of the counter 3 for the productive molding does not have to go, the counting operator 52 is moved to the left side of the fixing block 51 to force the clipped steel ball of the locator 53 to be clipped inside the other locating slot 524 of the counting operator 52. At this moment, the groove 523 of the counting operator 52 is moved above the operation thimble 4. Therefore, the contacting bump 522 of the counting operator 52 cannot press the operation thimble 4. As the mold closing is done, no productive molding of the counter 3 is counted.

As aforementioned, as the record for the productive molding has to go for the molding 100 having counter, the contacting bump 522 of the counting operator 52 can be moved above the contacting part 31 of the counter 3. When the mold closing is done, the contacting bump 522 pressed the operation thimble 4 and the operation thimble 4 pressed the contacting part 31 of the counter 3. One productive molding is counted. As the record for the productive molding does not have to go, the contacting bump 522 of the counting operator 52 can be moved aside the contacting part 31 of the counter 3. No productive molding counting of the counter 3 is proceeded. Accordingly, the counter 3 of the molding 100 does not have to be removed during the mold-repair.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A molding apparatus having a counter, comprising:
   a fixed mold half, opened with a through hole;
   a moving mold half, functioned in accordance with the fixed mold half;
   the counter, positioned at the fixed mold half, comprising a contacting part extending into the through hole of the fixed mold half;
   a locator, positioned at the moving mold half; and
   a counting operator, slidably set at the moving mold half, comprising a sliding main body, the locator and a contacting bump, wherein the sliding main body comprises two locating slots positioned at one end thereof, and the locator extends into the locating slots to locate the counting operator, and the contacting bump is positioned on the sliding main body and can press the contacting part of the counter.

2. The molding apparatus having the counter of claim 1, wherein an accommodating area is positioned at the moving half and the moving mold half further comprises a fixing block accommodated in the accommodating area, wherein a locating through hole is opened in the fixing block and the locator is positioned in the locating through hole, and a fitting slot is formed in the fixing block and the bottom of the fitting slot extends toward two sides and forms a spacing slideway, wherein the sliding main body of the counting operator is slidably set in the spacing slideway and the contacting bump is set in the fitting slot.

3. The molding apparatus having the counter of claim 2, wherein the counter further comprises an operation thimble that is movably set in the through hole of the fixed mold half, wherein one end of the operation thimble reaches the contacting part of the counter and the other end of the operation thimble dips into the fitting slot of the fixing block.

4. The molding apparatus having the counter of claim 2, wherein the locator comprises a spring and a clipped steel ball respectively put into the locating through hole, wherein one end of the clipped steel ball is located in the locating through hole to reach and press the spring and a portion of the other end of the clipped steel ball is exposed out of the locating through hole.

\* \* \* \* \*